United States Patent
Kaur et al.

(10) Patent No.: US 10,094,399 B2
(45) Date of Patent: Oct. 9, 2018

(54) PROCESS OF PREPARATION OF DRAG REDUCING POLYMERS AND USAGE THEREOF

(71) Applicant: Indian Oil Corporation Limited, Mumbai (IN)

(72) Inventors: Sukhdeep Kaur, Haryana (IN); Mohasin Momin, Haryana (IN); Mahendra Singh Negi, Haryana (IN); Gurmeet Singh, Haryana (IN); Bhasker Bantu, Haryana (IN); Naresh Kumar, Haryana (IN); Gurpreet Singh Kapur, Haryana (IN); Shashi Kant, Haryana (IN)

(73) Assignee: INDIAN OIL CORPORATION LIMITED, Mumbai (IN)

( * ) Notice: Subject to any disclaimer, the term of this patent is extended or adjusted under 35 U.S.C. 154(b) by 37 days.

(21) Appl. No.: 15/233,480

(22) Filed: Aug. 10, 2016

(65) Prior Publication Data

US 2017/0152330 A1   Jun. 1, 2017

(30) Foreign Application Priority Data

Nov. 30, 2015   (IN) .......................... 4495/MUM/2015

(51) Int. Cl.
*F15D 1/06* (2006.01)
*C08F 210/16* (2006.01)

(52) U.S. Cl.
CPC .............. *F15D 1/06* (2013.01); *C08F 210/16* (2013.01)

(58) Field of Classification Search
CPC ...... C08F 2/02; C08F 2/38; C08F 2/44; C08F 4/42; C08F 4/50; C08F 10/02; C08F 10/14; C08F 210/16
See application file for complete search history.

(56) References Cited

U.S. PATENT DOCUMENTS

| | | |
|---|---|---|
| 4,358,572 A | 11/1982 | Mack et al. |
| 4,433,123 A | 2/1984 | Mack |
| 4,493,904 A | 1/1985 | Mack |
| 5,416,179 A | 5/1995 | Welch et al. |
| 5,442,019 A | 8/1995 | Agapiou et al. |
| 5,449,732 A | 9/1995 | Smith et al. |
| 5,869,570 A | 2/1999 | Eaton et al. |
| 2015/0344593 A1* | 12/2015 | Sarma .................... C08F 10/00 526/126 |

FOREIGN PATENT DOCUMENTS

EP    1335941 B1    12/2005

* cited by examiner

*Primary Examiner* — Edward J Cain
(74) *Attorney, Agent, or Firm* — Maschoff Brennan

(57) ABSTRACT

The present invention relates to a process for preparing ultra-high molecular weight polyalphaolefin. The process consists of polymerizing alphaolefin monomers using the catalyst system consisting of supported Ziegler-Natta catalyst without internal donor in presence of co-catalyst based on alkyl aluminums. The resulting ultra-high molecular weight polyalphaolefins having intrinsic viscosity ≥10 dL/g are used as drag reducing polymers for increasing throughput in the pipelines by reducing frictional resistance in turbulent flow.

13 Claims, No Drawings

PROCESS OF PREPARATION OF DRAG REDUCING POLYMERS AND USAGE THEREOF

CROSS-REFERENCE TO RELATED APPLICATION

This application claims priority to Indian Patent Application No. 4495/MUM/2015, entitled "Process of Preparation of Drag Reducing Polymers and Usage Thereof," filed Nov. 30, 2015, now pending, the disclosure of which is hereby incorporated by reference in its entirety.

FIELD OF THE INVENTION

The present invention relates to process for preparing ultra-high molecular weight polyalphaolefin. The process consists of polymerizing alphaolefin monomers using the catalyst system consisting of supported Ziegler-Natta catalyst without internal donor in presence of co-catalyst based on alkyl aluminums. The resulting polyalphaolefins are used as drag reducing polymers for increasing throughput in the pipelines by reducing frictional resistance in turbulent flow.

BACKGROUND OF THE INVENTION

Ultrahigh molecular weight polyalphaolefins especially higher olefins are extensively used as drag reducing polymers in pipelines. It is well known in the art that to synthesis ultrahigh molecular weight polyolefins, first and second generation i.e., traditional Ziegler-Natta catalysts are used. These catalyst systems are basically $TiCl_3$ based and non supported in nature. The preferred catalyst system is $TiCl_3.1/3AlCl_3$ as catalyst and DEAC (diethyl aluminum chloride) as co-catalyst.

U.S. Pat. No. 4,358,572 teaches the usage of diether component to $TiCl_3.AlCl_3$ to provide better dispersion of the catalyst, reduces agglomeration of the catalyst and hence results in the improved activity of the catalyst.

U.S. Pat. No. 4,493,904 describes the usage of ketones and monoethers to the $TiCl_3.AlCl_3$.

U.S. Pat. No. 4,433,123 teaches the usage of phosphorus compounds along with the traditional ZN catalysts for polymerizing alpholefins to ultrahigh molecular weight.

U.S. Pat. No. 5,449,732 describes the usage of $TiCl_3.AA$ with dibutyl ether but in solvent free polymerization conditions.

U.S. Pat. No. 5,869,570 describes the usage of metallocene catalysts for polymerizing polyalphaolefins. They use viscosity reducing agent that includes a substantially hydrophobic dispersant which reduces the viscosity of the reaction mixture and disperse the localized micelles. They claim that the addition of the dispersant provides for high molecular weight polyalphaolefin and a more uniform molecular weight distribution of the resulting polyalphaolefin.

U.S. Pat. No. 5,442,019 and U.S. Pat. No. 5,416,179 describe the metallocene compounds, their preparation, suitable co-catalysts, and their use in polymerization processes.

EP1335941 describes Ziegler-Natta based catalyst system where magnesium dichloride supported catalyst is synthesized using monohydric alcohol and alkyl carboxylic acid esters as internal donor. The catalyst synthesized is further used for copolymerizing $C_4$-$C_{30}$ monoolefins with polyunsaturated aliphatic hydrocarbons like $C_4$-$C_{30}$ diene. This copolymerization is conducted using external donors based on alkoxy silanes and chain transferring agents such as hydrogen. The copolymerization is rapidly conducted to only 10-30% monomer conversions. The average molecular weight is >5 million Dalton. The said DRA obtain is a mixture of monomers, solvent and 7 wt % polymer.

None of the above said prior arts and the available literature discloses or teaches preparation of ultrahigh molecular weight polyalphaolefins using the supported ZN catalyst in the absence of internal electron donor with conversions >90%.

OBJECTIVE OF THE INVENTION

The objective of this invention is the process of preparation of ultrahigh molecular weight polyalphaolefins using catalyst and co-catalyst.

Further the objective of the invention is to describe a process of producing polyalphaolefin which is polymerizing alphaolefin monomers using the catalyst system consisting of supported Ziegler-Natta catalyst and co-catalyst.

Further the objective of the invention is that the process uses supported Ziegler-Natta catalyst having no internal donor.

Further the object of the invention is that the process uses alkyl aluminium based co-catalyst.

Further the objective of the invention is to avoid the usage of internal donor or use of external donor optionally during polymerization and it is solvent free polymerization.

SUMMARY OF THE INVENTION

The present invention describes a process of producing polyalphaolefin based drag reducing polymers where the process consists of polymerizing alphaolefin monomers using the supported Ziegler-Natta catalyst system without internal donor in presence of co-catalyst. The invention also describes the process of preparing drag reducing agent compositions using these polymers.

In one of the embodiment the present invention provides a process for preparing polyalphaolefin having ultra-high molecular weight, the process comprising:

(i) contacting a mixture of supported Ziegler-Natta catalyst without internal donor and a co-catalyst with an alphaolefin monomer to obtain a polymerization mixture;

(ii) keeping the polymerization mixture of step (i) at temperature in the range of −15° C. to 30° C. for at least 24 hours; and (iii) keeping the polymerization mixture of step (ii) at temperature in the range of 20° C. to 35° C. for at least 14 days for achieving conversion >90%.

In an embodiment the polymerization mixture of step (i) is kept at temperature in the range of −15° C. to 30° C. for at least 24 hours to 36 hours.

In an embodiment the polymerization mixture of step (ii) is kept at temperature in the range of 20° C. to 35° C. for at least 14 days to 20days.

In another embodiment of the present invention, the polymerization is conducted in bulk under inert and oxygen free conditions.

In another embodiment of the present invention, the supported Ziegler-Natta catalyst is combination of magnesium based precursor and transition metal compound without internal donor.

In another embodiment of the present invention, the co-catalyst is organoaluminums having at least four carbon atoms ($C_4$). In one of the preferred embodiment the co-catalyst is organoaluminum selected from the group non-limiting to triisobutylaluminum, tri-n-butylaluminum, tri-n- hexylaluminum, tri-n-octylaluminum; triisoprenyl aluminum; dibutylaluminum chloride, diisobutylaluminum chloride, butylaluminum sesquichloride, and dibutylaluminum hydride, aluminoxane such as isobutylaluminoxane, tetraethylaluminoxane and tetraisobutylaluminoxane and combinations thereof.

In one embodiment of the present invention, the mole ratio of the co-catalyst and the Ziegler-Natta catalyst is in the range of 1 to 250. In one of the preferred embodiments of the present invention, the mole ratio of the co-catalyst and the Ziegler-Natta catalyst is in the range of 1.5 to 150. In one of the preferred embodiment of the present invention, the mole ratio of the co-catalyst and the Ziegler-Natta catalyst is in the range of 1.5 to 100.

In yet another embodiment of the present invention, the alpha olefin monomer selected from the group comprising of $C_4$ and above alpha olefin monomers. In one of the preferred embodiment the alpha olefin monomer selected from the group comprising of 1-butene, 1-hexene, 1-octene, 1-decene, 1-dodecene and combination thereof.

In yet another embodiment of the present invention, the process optionally comprises external donor selected from alkoxysilane.

In yet another embodiment of the present invention, the polyalphaolefin having ultrahigh molecular weight with intrinsic viscosity ≥10 dL/g and are used as drag reducing polymers.

In yet another embodiment of the present invention, the supported Ziegler-Natta catalyst without internal donor is prepared by contacting magnesium based precursor with a transition metal compound in presence of a solvent.

In yet another embodiment of the present invention, the magnesium based precursor is solid in nature and is prepared by first contacting the magnesium with organohalide in presence of solvating agent as the first step and then followed by addition of alcohol.

In yet another embodiment of the present invention, the magnesium based precursor is liquid in nature and is prepared by contacting magnesium source with organohalide and alcohol in presence of a solvent in a single step.

In yet another embodiment of the present invention, the procedure of contacting the transition metal component is essentially repeated three times for having a catalyst that provides polyalphaolefin having Intrinsic Viscosity ≥10 dL/g.

In yet another embodiment of the present invention, the supported Ziegler-Natta catalyst without internal donor comprises transition metal from 3.0 wt % to 8.0 wt % and magnesium is from 15 wt % to 25 wt %.

The present invention provides a use of a supported Ziegler-Natta catalyst without internal donor for the preparation ultrahigh molecular weight polyalphaolefin based drag reducing polymers.

The present invention also provides a drag reducing agent composition comprising:
  ultrahigh molecular weight polyalphaolefin in the range of 10 to 35 wt. %;
  anti-agglomerating agent in the range of 10 to 45 wt %; and
  dispersant for making slurry in the range of 50 to 90 wt %.

In one of the embodiment of the present invention the drag reducing agent composition is used as drag reduction in pipeline conduit.

DETAILED DESCRIPTION OF THE INVENTION

The present invention provides a process of producing polyalphaolefin based drag reducing polymers wherein the process consists of polymerizing alphaolefin monomers using the supported Ziegler-Natta catalyst without internal donor in presence of co-catalyst.

In an embodiment, the supported Ziegler-Natta catalyst without internal donor is prepared by contacting the magnesium based precursor with transition metal in the presence of solvent. In another embodiment, the magnesium based precursor used in the present invention is prepared through the process as described in WO2014/045259 and WO2014/045260.

In an embodiment, the magnesium based precursor contains magnesium and may be liquid or solid in nature.

In another embodiment of the present invention, the transition metal compound represented by $M(OR)_pX_{4-p}$, where M is selected from, Titanium (Ti), Vanadium (V), Zirconium (Zr) and Hofnium (Hf); X is a halogen atom; R is a hydrocarbon group and p is an integer having value equal or less than 4, the transition metal compound is selected from a group comprising of transition metal tetrahalide, alkoxy transition metal trihalide/aryloxy transition metal trihalide, dialkoxy transition metal dihalide, trialkoxy transition metal monohalide, tetraalkoxy transition metal, and mixtures thereof, wherein:
  (a) the transition metal tetrahalide is selected from a group comprising of titanium tetrachloride, titanium tetrabromide and titanium tetraiodide and the likes for V, Zr and Hf;
  (b) alkoxy transition metal trihalide/aryloxy transition metal trihalide is selected from a group comprising of methoxytitanium trichloride, ethoxytitanium trichloride, butoxytitanium trichloride and phenoxytitanium trichloride and the likes for V, Zr and Hf;
  (c) dialkoxy transition metal dihalide is diethoxy transition metal dichloride and the likes for V, Zr and Hf;
  (d) trialkoxy transition metal monohalide is triethoxy transition metal chloride and the likes for V, Zr and Hf; and
  (e) tetraalkoxy transition metal is selected from a group comprising of tetrabutoxy titanium and tetraethoxy titanium and the likes for V, Zr and Hf.

In yet another embodiment of the present invention, the transition metal compound is titanium compound represented by $Ti(OR)_pX_{4-p}$, where X is a halogen atom; R is a hydrocarbon group and p is an integer having value equal or less than 4.

It is believed that liquid titanium compound helps in the formation of amorphous $MgCl_2$ as it acts as halogenating agent as well as is dispersed and supported on the catalyst surface.

In an embodiment, the titanium compound is added in amounts ranging from usually about at least 1 to 100 moles with respect to one mole of magnesium. In another embodiment, the titanium compound is added in amounts ranging from usually about at least 3 to 80 moles, with respect to one mole of magnesium. However usage of higher titanium compound is neither advantageous nor detrimental to catalyst synthesis process.

Typically, the contact procedure for transition metal and magnesium component is slowly added with drop wise addition at desired temperature and then heated to activate the reaction between both the components. Preferably, this reaction system is gradually heated to the temperature effective to carry out the reaction, preferably about −50° C. and about 150° C. More preferably this reaction system is gradually heated to the temperature effective to carry out the reaction, about −30° C. and about 120° C. In one of the embodiment heating is instigated at a rate of 0.1 to 10.0° C./minute. In another embodiment heating is instigated at a rate of 1 to 5.0° C./minute. The resultant solid component comprises of magnesium, transition metal and halogen components.

In an embodiment, the magnesium based precursor is contacted with solvent prior to transition metal contact. Preferably, the solvent can be aromatic or aliphatic and polar or non polar in nature examples not limiting to benzene, decane, kerosene, ethyl benzene, chlorobenzene, dichlorobenzene, toluene, o-chlorotoluene, xylene, dichloromethane, chloroform, cyclohexane and the like. In another embodiment, the contact time with the solvent is immediate to 5 h. Preferably the contact time with the solvent is immediate to 1 h. More preferably the contact time with the solvent is immediate to 0.5 h. In another embodiment, the contact temperature is from temperature 10° C. to 200° C. Preferably, the contact temperature is from 20° C. to 120° C.

The procedure of contacting the transition metal component is essentially repeated three or more times as desired. It was found by the inventor that the procedure of contacting transition metal three times is essential for having a catalyst that can provide polyalphaolefin having Intrinsic Viscosity (IV) ≥10 dL/g. In an embodiment, the resulting solid material recovered from the mixture can be contacted with the mixture of liquid transition metal component in solvent for at least 10 minutes up to 60 minutes, at temperature from about 25° C. to about 150° C. In one of the preferred embodiment, at temperature from about 30° C. to about 110° C.

The resulting solid component comprising of magnesium, transition metal and halogen can be separated from the reaction mixture either by filtration or decantation and finally washed with inert solvent to remove unreacted transition metal component and other side products. Usually, the resultant solid material is washed one or more times with inert solvent which is typically a hydrocarbon including, not limiting to aliphatic hydrocarbon like isopentane, isooctane, hexane, pentane or isohexane. Preferably, the resulting solid mixture is washed one or more times with inert hydrocarbon based solvent preferably, hexane at temperature from about 20° C. to about 80° C. Preferably, the resulting solid mixture is washed one or more times with inert hydrocarbon based solvent at temperature from about 25° C. to about 70° C. The solid catalyst then can be separated and dried or slurried in a hydrocarbon specifically heavy hydrocarbon such as mineral oil for further storage or use.

Preferably, the catalyst composition includes transition metal from about 3.0 wt % to 8.0 wt % and magnesium is from about 15 wt % to 25 wt % and this range may not be limited.

According to the embodiment, the present invention provides the method of polymerizing and/or copolymerizing alpholefins. In the preferred embodiment, the method of polymerization process is provided where the catalyst system is contacted with alphaolefin under polymerization conditions. The catalyst system includes but not limited to supported Ziegler-Natta catalyst without internal donor in the presence of the co-catalyst.

The supported Ziegler-Natta catalyst includes combination of magnesium moiety and transition metal moiety. The co-catalyst may include hydrides, organoaluminum, lithium, zinc, tin, cadmium, beryllium, magnesium, and combinations thereof. Preferably, the co-catalyst is organo aluminum compounds.

Preferably, the organoaluminum compounds include, but not limiting to, alkylaluminums such as trialkylaluminum such as preferably triethylaluminum, triisopropylaluminum, trii sobutyl aluminum, tri-n-butyl aluminum, tri-n-hexyl aluminum, tri-n-octyl aluminum; trialkenylaluminums such as triisoprenyl aluminum; dialkylaluminum halides such as di ethyl aluminum chloride, dibutylaluminum chloride, dii sobutyl aluminum chloride and diethyl aluminum bromide; alkylaluminum sesquihalides such as ethylaluminum sesquichloride, butylaluminum sesquichloride and ethylaluminum sesquibromide; dialkylaluminum hydrides such as diethylaluminum hydride and dibutylaluminum hydride; partially hydrogenated alkylaluminum such as ethylaluminum dihydride and propylaluminum dihydride and aluminoxane such as methylaluminoxane, isobutylaluminoxane, tetraethylaluminoxane and tetraisobutylaluminoxane; diethylaluminum ethoxide. The mole ratio of aluminum to titanium, in accordance with the present invention, is from about 1:1 to about 250:1. In one of the preferred embodiment the mole ratio of aluminum to titanium, in accordance with the present invention, is from about 1.5:1 to about 100:1.

The inventors found interestingly in the following invention that to achieve intrinsic viscosity of the resultant polymer ≥10 dL/g, organoaluminums having C4 and above are desired.

In an embodiment, the co-catalyst and the catalyst are contacted, in accordance with the present invention, from about 1 to 240 min. More preferably, from about 1 to 180 min.

In the preferred embodiment, the polymerization can be carried out using $C_2$ and higher alphaolefins. Since the polymer produced may be non crystalline, $C_4$ and higher monomers and its mixtures can be used.

In order to attain higher molecular weight polymers, it is preferred to control the chain terminations and/or chain transferring reactions.

In an embodiment of the invention, the polymerization can be conducted in bulk. The polymerization media contains at least 80% by weight of the alpholefins. Preferably, the alphaolefins comprise at least 90% by weight of the polymerization media. Most preferably, the alphaolefins comprise 95% by weight of the polymerization media.

In another embodiment, the temperature of polymerization to be maintained in the range of −50° C. to 30° C. More preferably between the temperature of polymerization to be maintained in the range of −30° C. to 10° C. The said appropriate temperature is being maintained to allow the viscosity to build which is at least 24 hours and forming ultrahigh molecular weight polyalphaolefins. All the polymerizations are conducted under inert and oxygen free conditions. Conversions more than 95% can be obtained when the polymerization is kept for several days. In one of the preferred embodiment, conversions more than 95% can be obtained when the polymerization is kept for two weeks.

In an embodiment, the polymerization essentially consists of contacting catalyst system comprising of supported Ziegler-Natta catalyst without internal donor in presence of the co-catalyst, with the alphaolefin monomer in the absence of solvent or in the presence of essential very low amount of solvent at temperatures desirable to produce ultrahigh molecular weight polyalphaolefins having intrinsic viscosity ≥10 dL/g.

Intrinsic Viscosity is used as an indirect method of measurement of molecular weight because the extremely high molecular weight of these materials makes the normal methods of determining molecular weight unreliable. Accordingly, inherent viscosity is determined using a Cannon Ubbelohde Four bulb shear dilution viscometer. Concentrations of 0.05 gram polymer/per 100 milliliters THF solvent is used at 25° C. Inherent viscosities are calculated for each of the last three bulbs (the high shear rate bulb is discounted because of excessive shear thinning) and plotted as a function of average shear rate. The plot was then used to obtain an inherent viscosity at a shear rate of 300 seconds$^{-1}$.

In an embodiment, after the bulk polymerization is completed, the polymer is further grinding under cryo or ambient conditions to form particles in presence of anti-agglomerating agent.

In another embodiment, anti-agglomerating agents include not limited to alumina, clay, silica, stearates of calcium and/or magnesium, talc, stearamides, petroleum or natural occurring waxes. The amount of these anti-agglomerating agents can be from 10 to 45 weight % of polymer.

In an embodiment, dispersant effective for making slurry and acting as thickening or dispersing or suspending agents are not limited to, include, water, alcohols, glycols, ketones, refinery distillates, refined vegetable oils and the likes. These dispersants can be used in mixtures also.

The "active polymer" is defined as the amount of neat polymer without any anti-agglomerating agent.

The drag reducing agent is combination of active polymer, anti-agglomerating agent and dispersant. In an embodiment, the amount of active polymer prepared through the invention, is preferably from 10 to 35 weight % of the total slurry. In another embodiment, the amount of anti-agglomerating agents is preferably from 10 to 45 wt % of active polymer. In another embodiment, the amount of dispersant for making slurry is preferably from 50 to 90 wt % of the total slurry.

Having described the basic aspects of the present invention, the following non-limiting examples illustrate specific embodiment thereof:

1. Preparation of Magnesium Based Precursor

In 500 ml glass reactor maintained at desired temperature, calculated amount of magnesium (powder or turnings), organohalide, solvating agent and alcohol were weighed and added into the reactor. For liquid precursor synthesis, this mixture was stirred and gradually heated to 90° C.±3.

After the activation of the reaction, the mixture was allowed to be maintained at same temperature for 6 h. The resulting solution was viscous in nature. For solid precursor synthesis, calculated amount of magnesium was added to the reactor followed by addition of calculated amount of organohalide followed by diethyl ether. This mixture was stirred and after the activation of the reaction, the mixture was allowed to be maintained at same temperature until all magnesium has reacted. To the resulting solution, the calculated amount of alcohol was added dropwise over a period of 1-2 h. After the completion of addition, the solution was allowed to stir for another 0.5 h. Finally, the ether was evaporated and solid compound was analyzed.

The precursors synthesized by the above procedure have been tabulated in Table 1.

TABLE 1

| Precursor | Mg Ratio | Benzyl chloride Ratio | Alcohol Ratio | Solvent | Alcohol | Mg (wt %) | Cl (wt %) |
|---|---|---|---|---|---|---|---|
| MGP#169 | 1 | 1 | 1.2 | diethyl-ether | Isobutanol | 14.2 | 23.6 |
| MGP#174 | 1 | 1 | 1.0 | diethyl-ether | 2-ethyl-1-hexanol | 11.3 | 18.3 |
| MGP#175 | 1 | 1 | 1.2 | diethyl-ether | ethanol | 17.5 | 30.3 |
| MGP#005s | 1 | 1 | 1.1 | diethyl-ether | 2-ethyl-1-hexanol | 11.5 | 17.8 |

2. Preparation of Supported Ziegler-Natta Catalyst

Into a three neck 500 ml jacketed reactor, added weighed amount of magnesium based precursor and 100 ml of dry chlorobenzene and stirred for 10-15 min at 40° C. To this added 60 ml of neat TiCl$_4$ and temperature was increased from 40° C. to 110° C. This mixture was heated to 110° C. for 0.5 h. The mixture was allowed to settle followed by decantation. The suspended solid component was again treated with 60 ml TiCl$_4$ and 60 ml chlorobenzene at 110° C. under stirring for 15 minutes. The mixture was allowed to settle followed by decantation. The above step was again repeated. The solid component was washed with hexane four times at 65° C. and dried under nitrogen till free flowing powder was obtained.

The solid catalysts composition synthesized by the above procedure has been tabulated in Table 2

TABLE 2

| Cat No | MGP# | Dispersion | Titanation | Mg wt % | Ti wt % |
|---|---|---|---|---|---|
| PEC#144 | MGP#169 (5.8 g) | chlorobenzene | Single; 2 h @ 110° C. | 16.9 | 7.1 |
| PEC#147 | MGP#175 (4.5 g) | chlorobenzene | Single; 2 h @ 110° C. | 18.2 | 5.3 |
| ZN#489 Comparative | MGP#174 (9.8 g) | Chlorobenzene; diisobutyl-phthalate as internal donor | Three; 110° C. | 18.4 | 3.1 |
| ZN#520 | MGP#005s (9.7 g) | chlorobenzene | Three; 110° C. | 17.4 | 3.0 |

3. Polymerization

The polymerizations were conducted in 100 ml glass bottles which were thoroughly cleaned and dried and transferred into glove box. All the polymerization manipulations like catalyst handling, co-catalyst dilution, co-catalyst charging were done in glove box. Representative procedure for polymerization was as followed: In 100 ml glass bottle equipped with magnetic stirring bar, known amount of catalyst was weighed and suspended in 10 ml of dry hexane. To this suspension, known amount of co-catalyst (5% v/v) was added through syringe and stirred. This was followed by monomer addition (100 ml). The reaction mixture was stirred till viscosity started to build up and then immediately transferred to freezer kept at −14° C. for at least 24 h. The polymerization was left for building up of conversions at the temperature 25° C. for at least 14 days.

Catalyst performance and polymer properties has been tabulated in Table 3:

TABLE 3

| Catalyst | | Polymerization | | | Polymer Analysis | |
|---|---|---|---|---|---|---|
| Cat No | Cat wt (mg) | Co-catalyst | Al/Ti ratio | Monomer | % conversion | Intrinsic Viscosity dL/g |
| PEC#144 | 31.0 | DiEthylAluminum Chloride | 2.5 | 1-octene | 92 | 2.6 |
| | 46.0 | Tri-n-octyl Aluminum | 100 | 1-octene | 89 | 1.9 |
| | 10.5 | Tri-n-octyl Aluminum | 50 | 1-octene | 93 | 2.1 |
| | 10.6 | Tri-n-octyl Aluminum | 25 | 1-octene | 94 | 3.0 |
| PEC#147 | 30.0 | DiEthylAluminum Chloride | 2.5 | 1-octene | no polymenzation | |
| | 10.0 | Tri-n-octyl Aluminum | 60 | 1-octene | 87 | 2.4 |
| | 11.0 | Tri-n-octyl Aluminum | 7.5 | 1-octene | no polymerization | |
| ZN#489 comparative | 20.5 | Tri-n-octyl Aluminum | 2.5 | 1-octene | No polymerization | |
| ZN#520 | 10.6 | Tri-n-octyl Aluminum | 60 | 1-octene | 95 | 7.9 |
| | 10.8 | Tri-n-octyl Aluminum | 30 | 1-octene | 95 | 8.4 |
| | 10.6 | Tri-n-octyl Aluminum | 10 | 1-octene | 94 | 12.4 |
| | 10.8 | Tri-n-octyl Aluminum | 5 | 1-octene | 99 | 14.4 |
| | 10.8 | Tri-n-octyl Aluminum | 5 | 1-decene | 98 | 15.1 |
| | 10.7 | Tri-n-octyl Aluminum | 5 | 1-hexene/1-dodecene (50/50 v/v) | 98 | 14.8 |
| | 10.8 | Tri-n-octyl Aluminum | | 1-octene/1-dodecene (50/50 v/v) | 98 | 14.9 |
| | 10.8 | Tri-n-octyl Aluminum | | 1-decene/1-dodecene (50/50 v/v) | 98 | 14.8 |
| | 20.8 | Tri-n-octyl Aluminum | 5 | 1-octene | 91 | 6.5 |
| | 11.0 | Tri-n-octyl Aluminum C-donor as external donor Al/Do = 40 | 5 | 1-octene | 98 | 12.6 |
| | 10.8 | Tri-n-octyl Aluminum C-donor as external donor Al/Do = 30 | 5 | 1-octene | 98 | 12.2 |
| | 10.6 | Tri-n-octyl Aluminum C-donor as external donor Al/Do = 20 | 5 | 1-octene | 99 | 11.4 |
| | 10.8 | Tri-n-octyl Aluminum PEEB as external donor Al/Do = 7 | 5 | 1-octene | 98 | 5.1 |
| | 10.6 | Tri-n-octyl Aluminum PEEB as external donor Al/Do = 5 | 5 | 1-octene | 98 | 4.6 |
| | 11.0 | Tri-n-octyl Aluminum PEEB as external donor Al/Do = 3 | 5 | 1-octene | 97 | 4.4 |
| | 10.8 | Tri-n-octyl Aluminum EB as external donor Al/Do = 5 | 5 | 1-octene | 95 | 4.7 |
| | 10.6 | Tri-n-octyl Aluminum Solution polymerization with hexane as solvent | 5 | 1-octene | 74 | 3.9 |
| | 10.6 | TriEthylAluminum | 5 | 1-octene | 78 | 4.0 |

In above table 3, C-donor is cyclohexylmethyl diemthoxy silane

4. Slurry (Drag Reducing Agent Composition) Preparation

A slurry (Slurry-A) was prepared using 25 wt % active polymer (grinded) along with 15 wt % of calicum stearate and 60 wt % of the alcohol/glycol mixture (1-hexanol/ethylene glycol monomethyl ether: 60/30 v/v). For the effective mixing of the contents, this slurry was homogeneized using IKA T18 digital Ultra Turrax.

Slurry-B was prepared using 25 wt % active polymer (grinded) along with 15 wt % of calicum stearate and 60 wt % of the soyabean oil and similarly homogenized.

We claim:

1. A process for preparing polyalphaolefin having ultra-high molecular weight, the process comprising:
   (i) contacting a mixture of supported Ziegler-Natta catalyst without internal donor and a co-catalyst with an alphaolefin monomer to obtain a polymerization mixture;
   (ii) keeping the polymerization mixture of step (i) at temperature in the range of 15° C. to 30° C. for at least 24 hours; and
   (iii) keeping the polymerization mixture of step (ii) at temperature in the range of 20° C. to 35° C. for at least 14 days to achieve conversion of >90%.

2. The process as claimed in claim 1, wherein the polymerization is conducted in bulk under inert and oxygen free conditions.

3. The process as claimed in claim 1, wherein the supported Ziegler-Natta catalyst is combination of magnesium based precursor and transition metal compound without internal donor.

4. The process as claimed in claim 1, wherein the co-catalyst is organoaluminum having at least four carbon atoms (C4).

5. The process as claimed in claim 1, wherein the mole ratio of the co-catalyst and the Ziegler-Natta catalyst is in the range of 1 to 250, preferably in the range of 1.5 to 150, more preferably in the range of 1.5 to 100.

6. The process as claimed in claim 1, wherein the alpha olefin monomer selected from the group comprising of C4 and above alpha olefin monomers.

7. The process as claimed in claim 1, wherein the process optionally comprises external donor selected from alkoxysilane.

8. The process as claimed in claim 1, wherein polyalphaolefin having ultrahigh molecular weight have intrinsic viscosity ≥10 dL/g and are used as drag reducing polymers.

9. The process as claimed in claim 1, wherein the supported Ziegler-Natta catalyst without internal donor is prepared by contacting magnesium based precursor with a transition metal compound in presence of a solvent.

10. The process as claimed in claim 9, wherein the wherein the magnesium based precursor is solid in nature and is prepared by first contacting the magnesium with organohalide in presence of solvating agent as the first step and then followed by addition of alcohol.

11. The process as claimed in claim 9, wherein the magnesium based precursor is liquid in nature and is prepared by contacting magnesium source with organohalide and alcohol in presence of a solvent in a single step.

12. The process as claimed in claim 9, wherein the procedure of contacting the transition metal component is essentially repeated three times for having a catalyst that provides polyalphaolefin having Intrinsic Viscosity ≥10 dL/g.

13. The process as claimed in claim 1, wherein the supported Ziegler-Natta catalyst without internal donor comprises transition metal from 3.0 wt % to 8.0 wt% and magnesium is from 15 wt % to 25 wt %.

* * * * *